United States Patent [19]

Glassey

[11] 4,277,981
[45] Jul. 14, 1981

[54] LEAD SCREW ACTUATED FLUID GAUGE

[75] Inventor: Gene Glassey, San Diego, Calif.

[73] Assignee: Fluid Data Systems, San Diego, Calif.

[21] Appl. No.: 120,694

[22] Filed: Feb. 11, 1980

Related U.S. Application Data

[63] Continuation-in-part of Ser. No. 100,937, Dec. 6, 1979.

[51] Int. Cl.³ .............................................. G01L 9/14
[52] U.S. Cl. ...................................... 73/701; 73/708; 73/722
[58] Field of Search .................. 73/701, 708, 722, 729

[56] References Cited

U.S. PATENT DOCUMENTS

| | | | |
|---|---|---|---|
| 3,045,489 | 7/1962 | Brandt | 73/708 |
| 3,084,551 | 4/1963 | Westman | 73/708 |
| 3,320,809 | 5/1967 | Andrae | 73/722 |
| 3,372,594 | 3/1968 | Bristol | 73/708 |
| 3,475,959 | 11/1969 | Glassey | 73/296 |
| 3,739,645 | 6/1973 | Gorgens et al. | 73/701 |

Primary Examiner—Donald O. Woodiel
Attorney, Agent, or Firm—Julian Caplan

[57] ABSTRACT

A balance beam has a fulcrum, at least one bellows (connected to a source of pressure or vacuum) acting on the beam and a connection to the armature of a differential transformer at one end. A poise is mounted for movement along the beam by rollers riding on shoulders formed on the beam. A carriage having a connection to the poise at the elevation of the axes of the rollers moves the poise and is, in turn, driven by a screw turned by a servomotor controlled by the differential transformer. Provision is made for minimizing temperature error both longitudinally and transversely of the beam. The fulcrum and bellows may be moved to different locations relative to the beam, using spaced drilled holes in the beam and the base plate. Various readouts may be connected to the screw, and recorders and control devices may also be driven by the screw.

9 Claims, 7 Drawing Figures

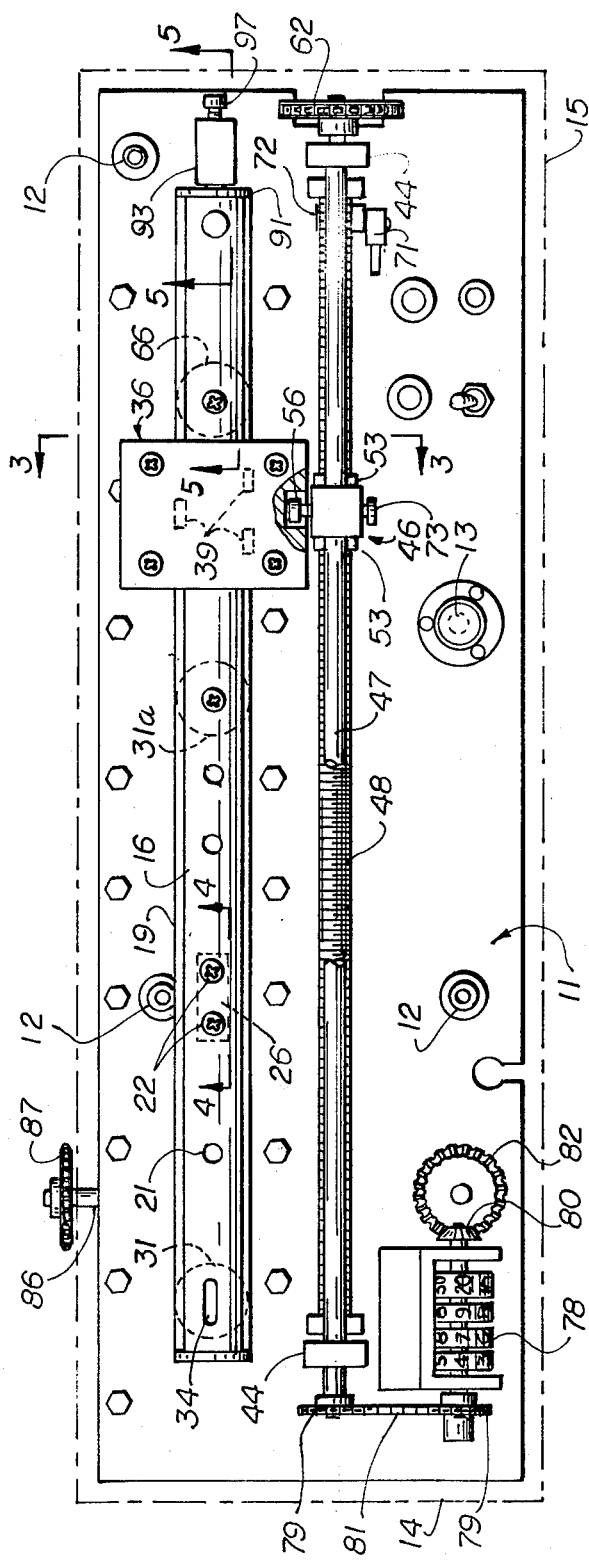
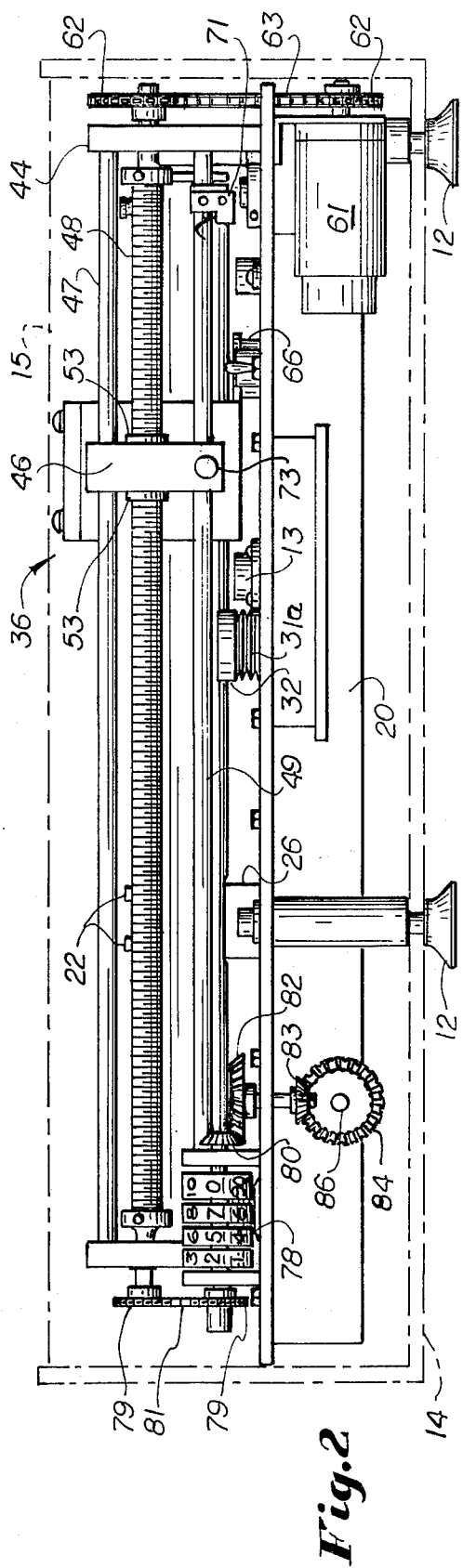

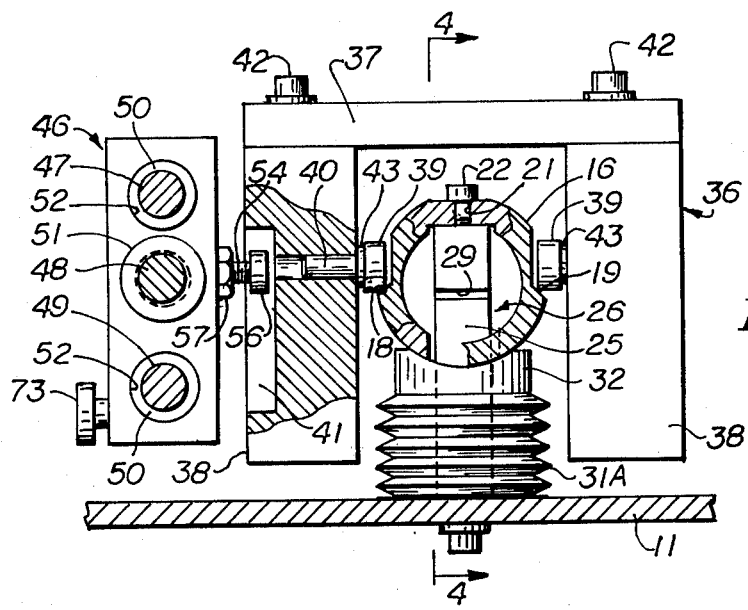
Fig. 3
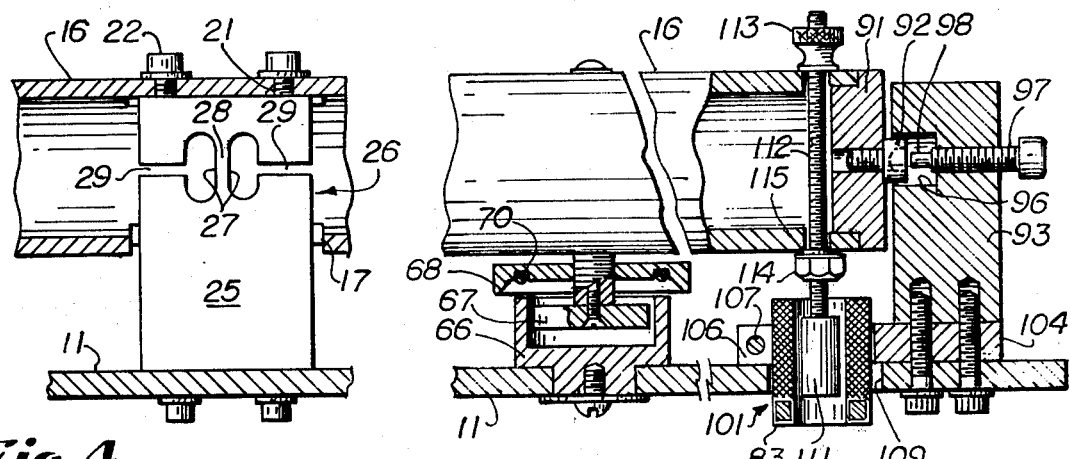
Fig. 4
Fig. 5
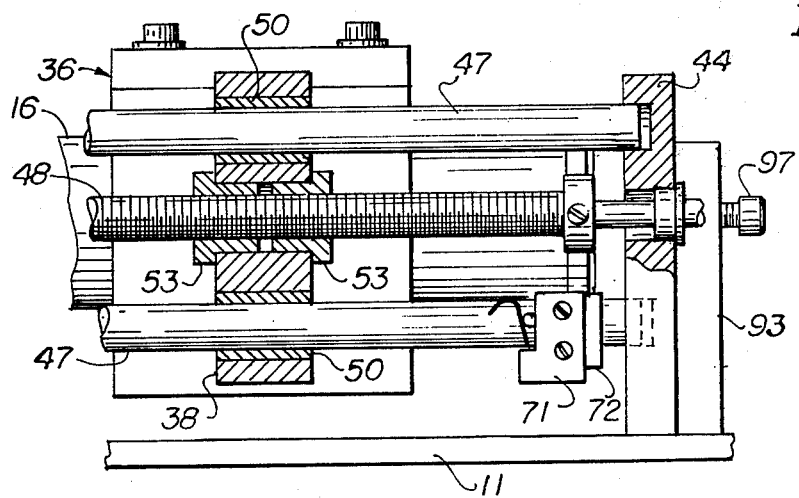
Fig. 6

LEAD SCREW ACTUATED FLUID GAUGE

This application is a continuation-in-part of co-pending application, Ser. No. 100,937, filed Dec. 6, 1979, entitled PRECISION PRESSURE-RESPONSIVE FLUID GAUGE.

This invention relates to a new and improved precision pressure-responsive instrument. The device is useful in tank gauging various liquids and determining specific gravity, flow, hydrostatic pressure, surface changes and other uses. It is particularly adaptable to the "purge bubble" principle for determination of liquid depth and specific gravity as an analog of pressure.

A particular feature and improvement of the present invention over prior guages of this type, such as shown in U.S. Pat. No. 3,475,959, is that it has intrinsically low susceptibility to variations of temperature. Thus, in a vertical sense, the bellows which is connected to the pressure source and bears against the balance beam may be made of Invar stock and is spaced from the beam with the use of an aluminum spacer, whereas the fulcrum is preferably constructed of stainless steel in such manner that its coefficient of expansion equals that of the bellows and spacer; and thus, there is no net force change vertically which is imparted to the beam with change of temperature. The balance position of the beam corresponds to the armature of a differential transformer, fixed to the end of a beam, being electrically centered in a differential transformer coil fixed to the instrument frame. Thus null condition, corresponding to zero DT output, is intrinsically stable and sensitive. The output of the DT at unbalance provides an input signal to an integrated circuit servo-amplifier whose output drives a permanent magnet motor to position the poise of the beam balance. The system is responsive to nominally one micro-inch movement of the tip of the beam less than one ten-thousandth inch poise positioning out of nominally 20 inches of travel. Output data are presented on a mechanical counter for local reference, with provision for mounting and gearing data transmission, recording and control devices appropriate to the application.

The device is also temperature compensated in a horizontal sense. The beam is preferably made of aluminum and the poise is driven by an aluminum lead screw, preferably of the same alloy as the beam and as the base, having identical coefficients of thermal expansion. The moment-distance between the fulcrum and bellows are changed with thermal expansion and contraction. The same thermal expansion and contraction applies to the lead screw and also to the base upon which all of the elements are mounted, thus nullifying the influence of expansion/contraction.

One of the features of the invention is the precise application of the desired forces and elimination of extraneous vertical forces or moments applied to the beam. Additionally, the linear transmission employed for the poise drive is of high intrinsic accuracy.

Thus, the instrument is of extreme accuracy determined largely by the linearity of the lead-screw of the poise drive. There is substantially zero backlash within the servo-loop, permitting fine resolution and excellent serve response.

The drive between the linear transmission and the poise is applied through a miniature ball bearing operating in a vertical slot in the poise. There is miniscule clearance between the outer race of the bearing and the walls of the slot to provide the necessary freedom for vertical movement of the beam, but with a minimum of horizontal freedom.

Thus, temperature influence is minimized in the construction hereinafter described substantially to the point of elimination. The bellows are made of Invar or other material having low co-efficient of expansion so that there is negligible change of the effective area with temperaure change. Vertical forces imparted to the beam are made theoretically zero by employment of vertical heights of different materials selected for their other advantageous properties to have zero net change of height measured relative to the axis of the beam. The components are dimensioned so that the net vertical change of height of the bellows plus an aluminum alloy spacer is equal to the stainless steel flexure fulcrum post. The same logic is employed in the differential transformer body and armature mountings to have zero net change of the electrically centered null position with temperature change.

Another feature of the invention is the mounting of the poise, which is usually made of brass (for its high density), on the beam which is preferably made of aluminum. The beam is provided with parallel tracks on opposite sides and the poise runs on these tracks on precision ball bearing rollers. The poise weight serves to keep the rollers snugged on one side by the applied force of a roller on the opposite side running on an inclined track. This permits differential expansion between the material of the poise (usually brass for its high density) and that of the beam, preferably an aluminum alloy for its low density.

The line contacts of the rollers are on the neutral axis of the beam. The axis of the fulcrum, a flexure pivot, is also co-incident with the neutral axis of the beam. The beam is thus insensitive to bearing friction of the three poise rollers which is exerted as a horizontal force on the neutral axis of the beam, coincident with the fulcrum. Application of the drive force from the linear transmission coincident with the horizontal axes of the rollers is without vertical component transmittal to the beam.

Another feature of the invention is the fact that the bellows, or the two bellows, may be moved to any of several pre-drilled holes in the base to alter the instrument in the field to change the range or span, using the same equipment in combination with interchangeable sprockets to correct the ratio to the readout counter and such other devices as may be employed.

The flexure design of the fulcrum and the great rigidity of the tubular beam and other design features described herein permit very high calibration accuracy in an operational instrument of moderate cost and physical size.

In addition, appropriate variations of the device accommodate tremendous variation in pressure range and variations in temperature. On the other hand, the device may be used to accommodate small differential pressures at high line pressure. A typical example is measuring differential pressure across primary orifices as in boiler feed water flow in power plants.

The electrical circuit hereinafter described is simple in components and cost and has high reliability.

The present invention may be used at remote stations and be battery operated. The construction is such that drain on the battery is minimum and hence replacement of batteries is infrequent.

Another feature of the invention is its extreme sensitivity and accuracy.

Additionally, the instrument is positive and reliable in operation.

One of the features of the invention is the lock for the balance during transportation and storage.

Other objects and advantages of the invention are set forth in detail in my said co-pending application.

Other objects of the present invention will become apparent upon reading the following specification and referring to the accompanying drawings in which similar characters of reference represent corresponding parts in each of the several views.

In the drawings:

FIG. 1 is a plan view of the instrument of the present invention;

FIG. 2 is a side elevation thereof;

FIG. 3 is an enlarged sectional view taken substantially along the line 3—3 of FIG. 1;

FIG. 4 is a sectional view taken substantially along the line 4—4 of FIG. 3;

FIG. 5 is an enlarged sectional view taken substantially along line 5—5 of FIG. 1;

FIG. 6 is a sectional view taken substantially along the line 6—6 of FIG. 3.

Figure 7:
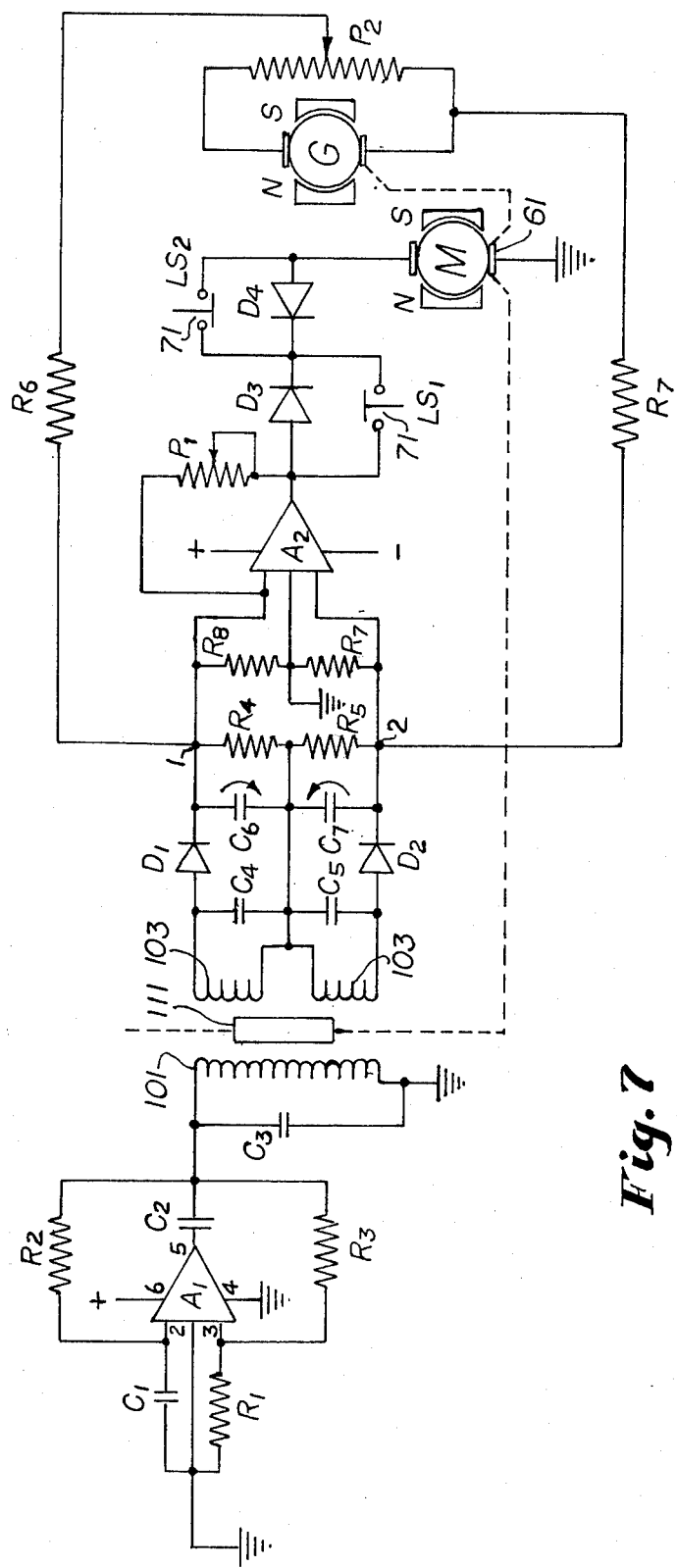
FIG. 7 is a schematic wiring diagram for the instrument.

The guage of the present invention has a base 11 preferably of an aluminum alloy, the same alloy being used in other horizontal components of this device. A tripod set of support legs two of which are adjustable in height are used to level base 11, a bubble spirit level 13 being used to determine when the base is level. Mounted around base 11 is a frame 14 which may support a cover 15. Extending horizontally longitudinally spaced above base 11 is tube 16 which serves as the beam of a beam balance. Tube 16 is cut away at the bottom in an opening 17. Midway of its height on one side is a horizontal longitudinal shoulder 18, and on the other side a downward-outward slanted shoulder 19. Spaced apart holes 21 on the top of tube 16 receive screws 22 which attach to the beam various other components as hereinafter described, the position of attachment being adjustable by reason of the spacing of the holes 21.

Located at a selected appropriate position and extending up from base 11 is a fulrum 26, formed of stainless steel alloy to provide temperature expansion with bellows and differential transformer, as elsewhere described. Fulcrum 26 is preferably in the form of a flexure pivot machined in a block with transverse cut-outs 27 which are spaced apart to provide a web 28 therebetween. Extending outward from each of the cut-outs 27 is a horizontal slot 29. Thus, as the beam 16 tilts, the web 28 flexes and provides a stable fulcrum which eliminates the necessity of a knife edge as in conventional beam balances. Further, the web form of flexure pivots advantageously which, in turn, provides numerous advantages over alternative designs, especially knife edge configurations and other designs that preclude subject force reversal. At least one bellows 31A is preferably of Invar metal, and on its top is a spacer 32 of aluminum which is connected to beam 16 by suitable means (not shown). Preferably, there is a slot 34 in the left end of tube 16 to permit horizontal adjustment of bellows 31. In some installations, a differential in pressure is to be measured. In such instance, a second bellows 31 may be positioned on base 11 on the side of fulcrum 26 opposite bellows 31A. Aforementioned slot 34 permits the slight adjustment necessary compensate for any small variation in effective areas between bellows that may be present resulting from small manufacturing variations in presumably identical bellows. Normally, for positive pressure installations, bellows 31A only is used. Bellows 31 only is used for installation where there is sub-atmospheric pressure. Both bellows 31 and 31A are used where differentials in pressure are to be measured.

Slideable along beam 16 is a poise 36. As best shown in FIG. 3, poise 36 has a horizontal apertured top piece 37 from which depend on opposite sides of beam 16 vertical pieces 38 secured to top piece 37 by screws 42. On the forward (left-hand as viewed in FIG. 3) piece 38 there are two longitudinally spaced apart inward extending pin-axes 40 carrying rollers 39 which ride on horizontal track 18. The rear vertical piece 38 has a pin-axis 40 and roller 38 which rides on downward-rearward slanted track 19. The three bearing rollers 39 provide three point suspension and stable equilibrium of the poise 25 on the tube rails. Since the poise 36 and the beam 16 have different coefficients of thermal expansion, the slanted shoulder 19 accommodates such expansion and further tends to draw the rollers 39 snugly against the inside reference edge of track 18. The front vertical piece 38 has on its outer face an accurately machined vertical slot 41.

Spaced forwardly on either end of the beam and attached to base 11 are vertical mounting blocks 44 which receive top and bottom ground metal rods 47 and 49 and also provide bearing mountings for lead screw 48 which projects beyond the blocks 44 in either direction. Rods 47, 49 and screw 48 support carriage 46. Rods 47, 49, preferably of ground stainless steel, are mounted in holes of slightly oversize diameter and are free to expand and contract independently of frame 11. (See FIG. 6). The screw 48 is of aluminum threaded rod, a typical alloy being 6061-T6.

Carriage 46 has bores 52 through which rods 47, 49 slide on bushings 50. There is also a bore 51 in which are received nuts 53 which mesh with the thread of screw 48. The nuts are half-nuts, one being adjustable and one being fixed to permit elimination of thread backlash and to compensate for wear.

Threaded into carriage 46 is a screw 54 which carries a bearing 56 on its outer end, the screw being held in place by lock nut 57. Bearing 46 fits into slot 41 on poise 36 with a slight clearance so that there is freedom of vertical motion; and further, so that the poise may be lifted off the beam when required. There is negligible backlash between movement of the carriage 46 and the poise 36 driven thereby. The axes of screw 54, bearing 56 and bearings 39 lie in the same plane. Screw 54 is used to adjust the longitudinal depth of engagement of the bearing 56 in slot 41.

Permanent magnet servo-motor 61 is mounted below base 11 and by means of pulleys 62 and belt 63 drives the right-hand end of screw 48 as viewed in FIGS. 1 and 2. Turning of screw 48 drives the carriage 46 along the rods 47, 49 and, therefore, moves the poise 36 along the beam 16.

At either end of the range of travel of carriage 46 there is a limit switch 71 mounted on rod 49 by clip 72 which limits travel of the poise 36. The position of the switch 71 may be adjusted by moving clip 72. Connected to carriage 46 is an actuator 73 which has a head 74 which contacts the actuators of switches 71.

A dash pot body 66 is mounted on base 11 and a dash pot piston 67 is fixed to beam 16 by threaded rod 68. The dash pot arrangement damps oscillation of the beam 16. The dash pot is filled with silicone oil. For shipment, the beam is locked and the dash pot cover 69 is screwed downward to provide an O-ring seal 70 against the rim of the pot-body.

Directing attention now to FIG. 5, in order to extend the temperature compensating features heretofore described, relative expansion and contraction of connecting members between the beam tube 16 and the electrical center of the differential transformer null-sensor 101 is made to equal the temperature change of the flexure-fulcrum assembly and hence the position of the beam to avoid force being applied to the beam by spring properties of the bellows if its nulling position is not identical with that of the null-sensor 101. The thermal expansion/contraction in a vertical sense of members 26, 31A and 85 is made to be the same by selection of materials for these elements and their mounts. Because of its electrical and mechanical symmetry, the electrical center or null position of the differential transformer body 103 does not vary with temperature. However, the body of the transformer through its length is subject to change by an amount determined by the materials of construction. Clamp 104 secures the transformer 103 at the electrical center. Thus, the electrical center may be considered a discrete point in a vertical line of the travel of the armature 111. In the preferred embodiment shown, a combination of materials is employed in a manner similar to the bellows-beam-fulcrum arrangement so that there is no differential movement with temperature change between the tip of beam 16 and the electrical center of the transformer 101. Austenitic stainless steel (e.g., type 316) is non-magnetic and is, in the preferred embodiment, used as rod 112 to space the armature 111 from the tip of the beam 16. As is noted in FIG. 5, the null-sensor 101 is located in an aperture 109 in base 11.

Expansion of the differential transformer armature 109 or body 101 with temperature does not alter the electro-magnetic symmetry relative to the differential transformer body electrical center relationship.

Clamp 104 is preferably of an aluminum alloy. The breadth of contact of clamp 104 with the coils 83 is sufficiently narrow to be treated for practical purposes as a line contact. As seen, clamp 104 is located above plate 11 and mounted thereon.

At each end of beam tube 16 is a closure 91. The right-hand closure as shown in FIG. 5 is threaded and receives socket head shoulder screw 92. Mounted just beyond the end of beam 16 is a stop 93 which is secured to base 11. Stop 93 has an opening 96 facing screw 92, but of slightly larger diameter than the head of the screw. Threaded into the stop 93 is a screw 97 which has a dowel form projection 98 which may be inserted in the socket in screw 92 to lock the beam 16 against movement when the instrument is being transported and stored. It will also be seen that when the screw 97 is backed off, nevertheless, the extent of the opening 96 limits the movement of the beam 16 and prevents over-travel, comparable to the types commonly employed on beam type scales and balances.

In manufacture or maintenance, the null-sensor 101 is electrically centered by locking beam 16 in the horizontal position while sliding the coil 103 in split clamp 104 while observing the servo-motion as a null indicator.

The differential transformer armature mount 112 is a threaded rod which extends up through holes in the tube 16 immediately inside the right-hand cap 91. On the top of the beam 16 is a nut 113, with opposing lock nut 114 locked beneath the beam. An elastomeric washer 115 on rod 112 is interposed between nut 114 and the underside of beam 16 to permit differential expansion between the tube and rod. Rod 112 is of the same stainless steel alloy and the same effective length as the flexure-fulcrum 25 hence expands and contracts equally with temperature change. The elastomeric washer eliminates influence of expansion of the aluminum beam body, thus isolating the influence of the stainless steel. (Except for the influence of one-half the thickness of clamp 104, which in turn is made equal to the wall thickness of the beam 16 above the flexure-fulcrum 25.) Thus, equality is maintained, but may be more accurately described as consisting of a substantial length of stainless steel plus a short length of aluminum alloy in each instance.

Directing attention now to the circuit diagram of FIG. 7, the differential transformer 101 is energized by a simple form of widely employed square wave oscillator employing RC timing circuits in combination with an operational amplifier A1. The square wave is converted to a sine wave by capacitors C3 and C4 and C5, respectively, across the primary and two secondaries of the differential transformer coil 103. The capacitors are selected to provide resonant circuits 103 tuned with the inductance of the differential transformer primary (see FIG. 7). This tuning also serves to provide a very strong error signal.

The secondaries of transformer 101 are connected in conventional series opposition so as to have a zero net output with the armature 111 electrically centered. However, even though the net output is zero, as sensed at points 1 and 2, the output of each secondary is strong at null, typically in excess of two volts for each half after rectification by diodes D1, D2 in series with each output. The resultant loop currents indicated by curved arrows around the capacitors C6, C7 is in the strong milliampere range, far overcoming the threshold voltage of the diodes D1, D2 and passing through resistors R4, R5, after being filtered by a second pair of capacitors C6, C7. In other words, there is phase sensitive demodulation. The null voltage as seen at points 1 and 2 remains zero at null. Inequalities and imperfections in resistors R4, R5, and the diodes D1, D2, etc., are cancelled by the DT nulling a slight distance away from the true electrical center to compensate.

An instrument such as is illustrated and is described in the following table is responsive to approximately one micro-inch of differential transformer displacement. The influence of electrical component drift is insignificant with the strength of the error signal. The output from the differential amplifier A2 goes to permanent magnet motor 61 which remains stationary with zero output and rotates in either direction depending upon the polarity of the drive voltage. Limit switches 71, which are located at either end of bottom rod 49 (or other desired positions) are in series with the output of the amplifier A2 and servo-motor. The switches cut off motor power near the limits of travel in conventional manner. The permanent magnet motor is unique as a type which lends itself to reversal and torque-voltage characteristics in two wire forms compatible with the general logic of this system. However, in fundamental form, once a limit switch were opened by overtravel (from any cause), the instrument would remain inoperative until operation were restored by external means.

Heretofore, this has been a problem since one of the intended uses of an instrument of this type is unattended, often in remote areas, and the overtravel of the poise 36 tends to occur in periods of key need. Although data for travel of the poise beyond full scale is lost, even with the present invention, such loss is of limited duration as contrasted with subsequent disablement. The use of diodes D3, D4, across the contacts of the limit switches 71, pointed in direction to pass reverse current only, solves the problem. By this means, the instrument can freely travel away from the limit switches.

The generator G is a tachometer type and generates a derivative voltage for anti-hunt damping which is mixed with the error signal at points 1 and 2 following adjustment of the damping signal by potentiometer P2.

It will be understood that the choice of components is subject to wide variation, but for practical purposes, in a specific embodiment wherein the oscillator is normally 2.5 KHz, the following are suggested components:

R1: 11K (ohms)
R2: 30K
R3: 10K
R4: 10K
R5: 10K
R6: 10K
R7: 10K
R8: 10K
R9: 10K

P1: 5 Meg
P2: 5 Meg

C1: 0.1 $\mu\mu$Fd
C2: 4.7
C3: 0.10
C4: 0.05
C5: 0.05
C6: 22
C7: 22

D1: IN 4001
D2: IN 4001
D3: IN 4001
D4: IN 4001

A1-LM386
A2-LH0021CK (National Semiconductor)

What is claimed is:

1. In a pressure-responsive gauge of the type having a base, a balance beam, a fulcrum pivotally supporting said beam relative to said base, pressure-responsive means interposed between said base and said beam arranged to tilt said beam, a poise slideable along said beam to counterbalance the force of said pressure-responsive means, drive means for moving said poise, and a servo-motor arranged to actuate said drive means, an armature attached to one end of said beam, a differential transformer excited by said armature, an electric circuit including said transformer and said servo-motor functioning to move said poise to null said transformer and a read-out driven by said servo-motor, the improvement wherein said drive means comprises a lead screw parallel to the neutral position of said beam, means interconnecting said screw and said servo-motor, a carriage in threaded engagement with said screw, mounting means mounting said carriage for movement parallel to said beam, and transmission means for transmitting movement of said carriage to said poise, and wherein said guage further comprises temperature responsive means to compensate for temperature variations in a vertical sense comprising a spacer between said pressure-responsive means and said base of a different material than said pressure-responsive means, said spacer and said pressure-responsive means having dimensions and coefficients of expansion such that they expand to the same extent as said fulcrum, a clamp adjustably clamping said transformer vertically relative to said base, the materials of said clamp, armature and spacer being such that the position of the midpoint of said armature relative to the null point of said transformer remains fixed despite temperature variations.

2. The improvement of claim 1 in which said gauge is longitudinally temperature compensated, said mounting means comprising a rod extending parallel to said beam, said carriage being slideably supported by said rod and said base, said screw and said beam having substantially the same coefficient of expansion, said rod being free to expand and contract independently.

3. The improvement of claim 2 in which said beam has a horizontal longitudinal first shoulder and a downward-slanted longitudinal second shoulder and said poise has first roller means riding on said first shoulder and second roller means riding on said second shoulder, whereby thermal expansion in a transverse horizontal sense of said poise and said beam merely causes movement of said second roller means inward and outward of said second shoulder.

4. The improvement of claim 3 in which said transmission means comprises a roller mounted on said carriage having an axis at the same elevation as the axis of said first and second roller means, said roller fitting into a vertical slot formed in said poise.

5. The improvement of claim 2 which further comprises a block at either end of said base, means rotatably mounting said screw in said blocks parallel to said rod, means for mounting said rod in said blocks and means for securing said screw in said blocks.

6. The improvement of claim 5 which further comprises a second rod mounted in said blocks parallel to said first-mentioned rod, at least one limit switch connected into said electric circuit adjustably positioned longitudinally relative to said beam, and an actuator for said limit switch attached to said carriage to open said switch to stop said servo-motor when said actuator engages said limit switch.

7. The improvement of claim 2 in which said beam is a hollow tube cut away in a longitudinal slot at the bottom, said fulcrum extending up through said slot, and wherein said beam and said base have a plurality of aligned, longitudinally spaced holes, said fulcrum and said pressure-responsive means being adjustably positioned along said beam and secured to said beam and said base by attachment means passing through selected aligned holes.

8. The improvement of claim 1 in which said electric circuit comprises a DC power souce, an operational amplifier for said source, components imposing on the primary and secondaries of said differential transformer a sine wave current tuned to the inductance of said transformer, rectifier means for said secondaries, a phase sensitive demodulation means looped around each of the said secondaries, a power amplifier receiving the outputs of said secondaries and driving said servo-motor depending upon the position of said armature relative to said transformer.

9. The improvement of claim 8 which further comprises a tachometer type generator coupled to said motor and arranged to feed back to said power amplifier an anti-hunting voltage.

* * * * *